Sept. 14, 1926.

H. W. PEACE 1,600,010

CYCLE PEDAL

Filed August 24, 1925

Inventor.
Harvey Webb Peace
by H. J. S. Dennison
atty

Patented Sept. 14, 1926.

1,600,010

UNITED STATES PATENT OFFICE.

HARVEY WEBB PEACE, OF TORONTO, ONTARIO, CANADA, ASSIGNOR OF ONE-HALF TO JOHN W. GIBSON, OF TORONTO, CANADA.

CYCLE PEDAL.

Application filed August 24, 1925. Serial No. 52,160.

The principal object of this invention is to devise a simple and inexpensive form of pedal, particularly adapted for children's cycles and velocipedes but which will give the desired service and will obviate damage to shoes and furniture.

The principal feature of the invention consists in the arrangement of a rotatable sleeve upon a spindle and the insertion of said sleeve and spindle into an orifice in a rubber pedal block.

In the drawings, Figure 1 is a perspective view of my improved pedal.

Figure 1:
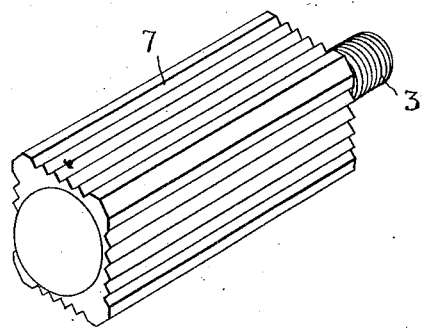
Figure 3:
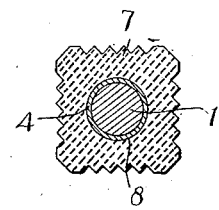
Figure 3 is a cross sectional view of the pedal.
Figure 2:
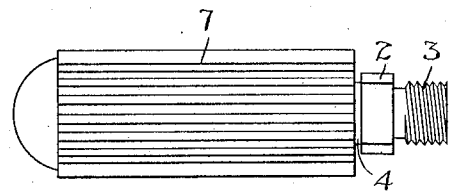
Figure 2 is a side elevational view.

Figure 3ª is a perspective view of a modified form.

Figure 4:
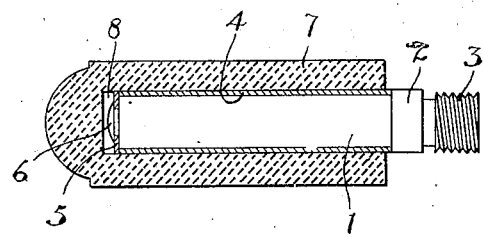
Figure 3A:
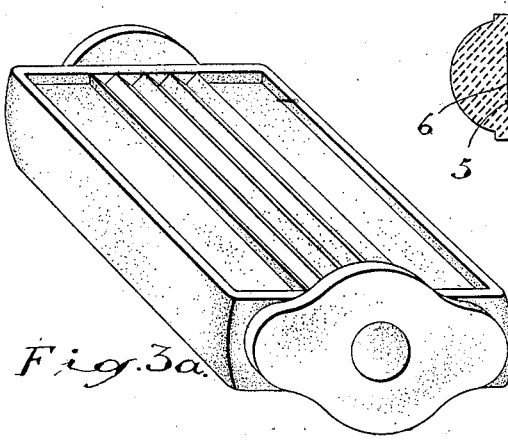

Figure 4 is a longitudinal mid-sectional view of Fig. 3.

In children's bicycles, tricycles, velocipedes and the like it has been the practice to use a stamped metal pedal and these are very hard on the soft leather shoes worn by children and they are also very destructive to the furniture and wood-work in the house where the cycles are frequently played with, and the present invention has been devised to eliminate the stamped metal pedal and also to produce a pedal which will be much more comfortable in use than the ordinary type.

The present form of pedal consists of a spindle 1 which is here shown in the simple form of a cylinder having a shouldered flange 2 arranged adjacent to the threaded end 3. Upon the cylindrical portion of the spindle 1 is rotatably mounted a piece of tubing 4 of exactly the same length or very slightly shorter than the cylindrical portion, said tubing abutting the shoulder 2.

The tube 4 is held in position on the spindle 1 by a washer 5 which is secured against the end of the spindle by the rivet projection 6 from the end of said spindle.

The pedal block 7 is in the form of a block of rubber or any other suitable composition, having a hole 8 formed therein extending inwardly from one end, said hole being preferably closed at the other end.

The hole 8 in the block 7 is formed of a slightly lesser diameter than the diameter of the tube 4 so that when the tube is inserted into the hole the material of the block will be expanded slightly, consequently it will grip the entire length of the tube very securely. Further, as the hole is closed the tube and spindle will virtually hold the inner end of the hole 8 air tight so that it will be very difficult, if not impossible, to remove the rubber from the tube once it is placed in position.

The block 7 may be of any desirable shape. As herein shown, it is square in cross section but it may be of an oblong or oval shape if a wider pedal is desired.

It will be seen that as the hole 8 does not extend through the pedal block no metal portion of the pedal can possibly come into contact with furniture or walls or with the shoes of the person using the cycle.

The structure is extremely simple but very efficient and while a simple cylindrical bearing is herein shown it will be readily understood that the sleeve 4 may, without any inventive ingenuity, be mounted upon ball bearings on the spindle before it is inserted into the pedal block.

Another important feature in the use of this pedal is that as the entire exposed part of the pedal is rubber a child will not injure its legs by scraping against same.

It will be understood by reference to Figure 3ª that an adult or full size pedal may be made any desired shape and be secured upon a sleeve journalled on the pedal spindle in a like manner to that described.

What I claim as my invention is:—

1. A cycle pedal, comprising, a single spindle, a sleeve rotatably mounted on the spindle, means for holding the sleeve on the spindle, and a single block of material having a hole therein extending inwardly from one end and terminating short of the length of the block into which the sleeve is inserted.

2. A cycle pedal, comprising, a block of rubber material having a cylindrical hole therein opening from one end and closed at the other end, a metal sleeve frictionally engaging the wall of said hole, a spindle rotatable in said sleeve, and means enclosed within said block for securing the spindle in said sleeve.

3. A cycle pedal, comprising, a block of rubber material having a cylindrical hole therein opening from one end, a metal sleeve frictionally engaging the wall of said hole, a spindle rotatable in said sleeve, a shoulder on the spindle abutting the outer end of the sleeve, and a washer riveted on the inner end of the spindle and abutting the inner end of the sleeve.

HARVEY WEBB PEACE.